US012069454B2

(12) United States Patent
Seldess et al.

(10) Patent No.: US 12,069,454 B2
(45) Date of Patent: *Aug. 20, 2024

(54) SUBBAND SPATIAL PROCESSING FOR OUTWARD-FACING TRANSAURAL LOUDSPEAKER SYSTEMS

(71) Applicant: Boomcloud 360, Inc., Encinitas, CA (US)

(72) Inventors: Zachary Seldess, San Diego, CA (US); Joseph Mariglio, Encinitas, CA (US)

(73) Assignee: Boomcloud 360, Inc., Encinitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/144,575

(22) Filed: May 8, 2023

(65) Prior Publication Data

US 2023/0276174 A1 Aug. 31, 2023

Related U.S. Application Data

(63) Continuation of application No. 17/544,532, filed on Dec. 7, 2021, which is a continuation of application (Continued)

(51) Int. Cl.

*H04S 1/00* (2006.01)
*H04R 3/14* (2006.01)

(Continued)

(52) U.S. Cl.

CPC ................. *H04R 3/14* (2013.01); *H04R 5/02* (2013.01); *H04R 5/04* (2013.01); *H04S 1/007* (2013.01); *H04S 2400/13* (2013.01)

(58) Field of Classification Search

None

See application file for complete search history.

(56) References Cited

U.S. PATENT DOCUMENTS 5,553,147 A 9/1996 Pineau
5,870,484 A 2/1999 Greenberger (Continued)

FOREIGN PATENT DOCUMENTS

CN 101212834 A 7/2008
CN 102316397 A 1/2012

(Continued)

OTHER PUBLICATIONS

China National Intellectual Property Administration, Office Action, CN Patent Application No. 201880077212.6, Jan. 29, 2021, 7 pages.

(Continued)

*Primary Examiner* — James K Mooney

(74) *Attorney, Agent, or Firm* — Fenwick & West LLP

(57) ABSTRACT

Embodiments relate to audio processing for opposite facing speaker configurations that results in multiple optimal listening regions around the speakers. A system includes a left speaker and a right speaker in an opposite facing speaker configuration, and a crosstalk cancellation processor connected with the left speaker and the right speaker. The crosstalk cancellation processor applies a crosstalk cancellation to an input audio signal to generate left and right output channels. The left output channel is provided to the left speaker and the right output channel is provided to the right speaker to generate sound including multiple crosstalk cancelled listening regions that are spaced apart.

27 Claims, 10 Drawing Sheets

Related U.S. Application Data

No. 16/669,440, filed on Oct. 30, 2019, now Pat. No. 11,218,806, which is a continuation of application No. 16/147,308, filed on Sep. 28, 2018, now Pat. No. 10,511,909.

(60) Provisional application No. 62/592,302, filed on Nov. 29, 2017.

(51) Int. Cl.

| | |
|---|---|
| ***H04R 5/02*** | (2006.01) |
| ***H04R 5/04*** | (2006.01) |

(56) References Cited

U.S. PATENT DOCUMENTS

| | | | |
|---|---|---|---|
| 5,995,631 | A | 11/1999 | Kamada et al. |
| 8,238,560 | B2 | 8/2012 | Oh et al. |
| 8,638,959 | B1 | 1/2014 | Hall |
| 8,867,750 | B2 | 10/2014 | Brown |
| 9,269,360 | B2 | 2/2016 | McGrath |
| 2007/0092091 | A1 | 4/2007 | Noro et al. |
| 2011/0025927 | A1 | 2/2011 | Yana et al. |
| 2012/0008806 | A1 | 1/2012 | Hess |
| 2012/0099733 | A1 | 4/2012 | Wang et al. |
| 2012/0140959 | A1 | 6/2012 | Fincham |
| 2013/0163766 | A1 | 6/2013 | Choueiri |
| 2016/0286329 | A1 | 9/2016 | Grosche et al. |
| 2017/0053636 | A1 | 2/2017 | Oswald et al. |
| 2017/0208411 | A1 | 7/2017 | Seldess et al. |
| 2017/0257725 | A1 | 9/2017 | Sapozhnykov |
| 2017/0289683 | A1 | 10/2017 | Eichfeld et al. |

FOREIGN PATENT DOCUMENTS

| | | | |
|---|---|---|---|
| CN | 106664489 | A | 5/2017 |
| CN | 107004427 | A | 8/2017 |
| CN | 107105366 | A | 8/2017 |
| DE | 102007032272 | A1 | 1/2009 |
| EP | 3340660 | A1 | 6/2018 |
| JP | H02298200 | A | 12/1990 |
| JP | 2008-278498 | A | 11/2008 |
| JP | 2015-019150 | A | 1/2015 |
| JP | 2015-144394 | A | 8/2015 |
| JP | 2015-144395 | A | 8/2015 |
| KR | 10-0739762 | B1 | 7/2007 |
| KR | 10-2017-0126105 | A | 11/2017 |
| TW | 203159 | B | 4/1993 |
| TW | M271332 | U | 7/2005 |

OTHER PUBLICATIONS

European Patent Office, Extended European Search Report and Opinion, EP Patent Application No. 18882936.0, Jun. 22, 2021, 9 pages.

Foo, K et al. "Three-Dimensional Sound Localization with Multiple Loudspeakers Using a Pair-Wise Association Paradigm and Embedded HRTFs," *Audio Engineering Society*, May 1998, pp. 1-17.

Japan Patent Office, Office Action, JP Patent Application No. 2020-529259, Feb. 2, 2021, 10 pages.

Korean Intellectual Property Office, Office Action, KR Patent Application No. 10-2020-7032403, Apr. 19, 2021, 10 pages.

PCT International Search Report and Written Opinion, PCT Application No. PCT/US2018/062491, Mar. 21, 2019, 13 pages.

Taiwan Intellectual Property Office, Office Action, TW Patent Application No. 109113979, Mar. 2, 2021, 7 pages.

United States Office Action, U.S. Appl. No. 16/147,308, filed Mar. 18, 2019, 12 pages.

United States Office Action, U.S. Appl. No. 16/669,440, filed Apr. 21, 2021, 8 pages.

United States Office Action, U.S. Appl. No. 16/669,440, filed Dec. 8, 2020, 9 pages.

United States Office Action, U.S. Appl. No. 17/544,532, filed Oct. 13, 2022, 7 pages.

Hooks, S. "Powerful Dolby Atmos Sound Coming to Xbox One and Windows 10," Xbox.com, Dec. 14, 2016, 6 pages, Retrieved from the internet <URL:https://news.xbox.com/en-us/2016/12/14/dolby-atmos-xbox-one-windows-10/>.

Dolby, "Dolby Virtual Speaker," Dolby Technologies, Jan. 29, 2009, 1 page, Retrieved from the internet <URL:https://web.archive.org/web/20090129084314/http:/www.dolby.com/consumer/technology/virtual_speaker.html>.

Dolby, "Dolby Virtual Speaker Technology: Fundamental Principles," Dolby Technologies, Feb. 4, 2009, 5 pages, Retrieved from the internet <URL:https://web.archive.org/web/20090204003955/http:/www.dolby.com/consumer/technology/virtual_speaker_wp.html>.

Dolby, "Dolby PC Entertainment Experience," Dolby Personal Computer, Feb. 10, 2009, 1 page, Retrieved from the internet <URL:https://web.archive.org/web/20090210195032/http:/www.dolby.com/consumer/pc/pcee/index.html>.

Deboer, C. "Dolby Updates PC Entertainment Experience Program," Audioholics.com, Mar. 12, 2008, 2 pages, Retrieved from the internet <URL:https://www.audioholics.com/news/dolby-pc-entertainment-experience>.

China National Intellectual Property Administration, Office Action with English Translation, Chinese Patent Application No. 202210427620.8, Apr. 11, 2024, 15 pages.

SUBBAND SPATIAL PROCESSING FOR OUTWARD-FACING TRANSAURAL LOUDSPEAKER SYSTEMS

CROSS REFERENCE TO RELATED APPLICATION

This application is a continuation of U.S. Non-Provisional patent application Ser. No. 17/544,532, filed on Dec. 7, 2021, which is a continuation of U.S. Non-Provisional patent application Ser. No. 16/669,440, (now U.S. Pat. No. 11,218,806), filed on Oct. 30, 2019, which is a continuation of U.S. Non-Provisional patent application Ser. No. 16/147,308, (now U.S. Pat. No. 10,511,909), filed Sep. 28, 2018, which claims the benefit of U.S. Provisional Application No. 62/592,302, filed Nov. 29, 2017, all the foregoing are incorporated by reference in their entirety.

TECHNICAL FIELD

The subject matter described herein relates to audio processing, and more particularly to crosstalk cancellation for opposite facing speaker configurations.

BACKGROUND

Stereophonic sound reproduction involves encoding and reproducing signals containing spatial properties of a sound field using two or more loudspeakers. Stereophonic sound enables a listener to perceive a spatial sense in the sound field. In a typical stereophonic sound reproduction system, two "in field" loudspeakers positioned at fixed locations in the listening field convert a stereo signal into sound waves. The sound waves from each in field loudspeaker propagate through space towards both ears of a listener at an optimal listening region to create an impression of sound heard from various directions within the sound field. However, stereophonic sound reproduction results in one optimal listening region which is unsuitable for multiple listeners at different locations, or fails to accommodate listener movement.

SUMMARY

Embodiments relate to audio processing for opposite facing speaker configurations that results in multiple optimal listening regions (also referred to as "crosstalk cancelled listening regions") around the speakers. A system includes a left speaker and a right speaker in an opposite facing speaker configuration, and a crosstalk cancellation processor connected with the left speaker and the right speaker. The crosstalk cancellation processor is configured to: separate a left channel of the input audio signal into a left inband signal and a left out-of-band signal; separate a right channel of the input audio signal into a right inband signal and a right out-of-band signal; generate a left crosstalk cancellation component by filtering and time delaying the left inband signal; generate a right crosstalk cancellation component by filtering and time delaying the right inband signal; generate a left output channel by combining the right crosstalk cancellation component with the left inband signal and the left out-of-band signal; generate a right output channel by combining the left crosstalk cancellation component with the right inband signal and the right out-of-band signal; and provide the left output channel to a left speaker and the right output channel to a right speaker to generate sound including a plurality of crosstalk cancelled listening regions that are spaced apart.

In some embodiments, the plurality of crosstalk cancelled listening regions include a first crosstalk cancelled listening region separated from a second crosstalk cancelled listening region by a mono fill region.

In some embodiments, the left speaker and the right speaker in the opposite facing speaker configuration includes the left speaker and right speaker being addressing outward with respect to each other.

In some embodiments, the left speaker and the right speaker in the opposite facing speaker configuration includes the left speaker and right speaker being spaced apart and addressing inward with respect to each other.

In some embodiments, the crosstalk cancellation processor is further configured to provide the left output channel to another left speaker and the right output channel to another right speaker. The left speaker and the other left speaker address outward with respect to each other and form a left speaker pair. The right speaker and the other right speaker address outward with respect to each other and form a right speaker pair. The left speaker pair and right speaker pair are spaced apart with the left speaker and the right speaker addressing inward with respect to each other Some embodiments include a non-transitory computer readable medium storing instructions that, when executed by one or more processors ("processor"), configures the processor to: separate a left channel of an input audio signal into a left inband signal and a left out-of-band signal; separate a right channel of the input audio signal into a right inband signal and a right out-of-band signal; generate a left crosstalk cancellation component by filtering and time delaying the left inband signal; generate a right crosstalk cancellation component by filtering and time delaying the right inband signal; generate a left output channel by combining the right crosstalk cancellation component with the left inband signal and the left out-of-band signal; generate a right output channel by combining the left crosstalk cancellation component with the right inband signal and the right out-of-band signal; and provide the left output channel to a left speaker and the right output channel to a right speaker to generate sound. The left speaker and the right speaker are in an opposite facing speaker configuration such that the sound provides a plurality of crosstalk cancelled listening regions that are spaced apart.

Some embodiments include a method for processing an input audio signal, including: separating a left channel of the input audio signal into a left inband signal and a left out-of-band signal; separating a right channel of the input audio signal into a right inband signal and a right out-of-band signal; generating a left crosstalk cancellation component by filtering and time delaying the left inband signal; generating a right crosstalk cancellation component by filtering and time delaying the right inband signal; generating a left output channel by combining the right crosstalk cancellation component with the left inband signal and the left out-of-band signal; generating a right output channel by combining the left crosstalk cancellation component with the right inband signal and the right out-of-band signal; and providing the left output channel to a left speaker and the right output channel to a right speaker to generate sound. The left speaker and the right speaker are in an opposite facing speaker configuration such that the sound provides a plurality of crosstalk cancelled listening regions that are spaced apart

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to audio processing with crosstalk cancellation for opposite facing speaker configurations. Crosstalk cancellation blends a phase-inverted, filtered and delayed version of a contralateral signal with an ipsilateral signal over trans-aural loudspeakers. Crosstalk cancellation may be described as defined in Equation 1:

$$L \equiv T_i + T_c = (A_i * x_i) + A_c * x_c * z^{-\delta} \qquad \text{Eq. (1)}$$

where Ai and Ac are delay-canonical matrices applying the ipsolateral and contralateral filters, respectively, $z^{-\delta}$ is a delay operator where $\delta$ is the delay in (possibly fractional) samples to be applied to the contralateral signal, Ti and Tc are the transformed ipsilateral and contralateral signals, and xi and xc are the input ipsilateral and contralateral signals.

Figure 1A:
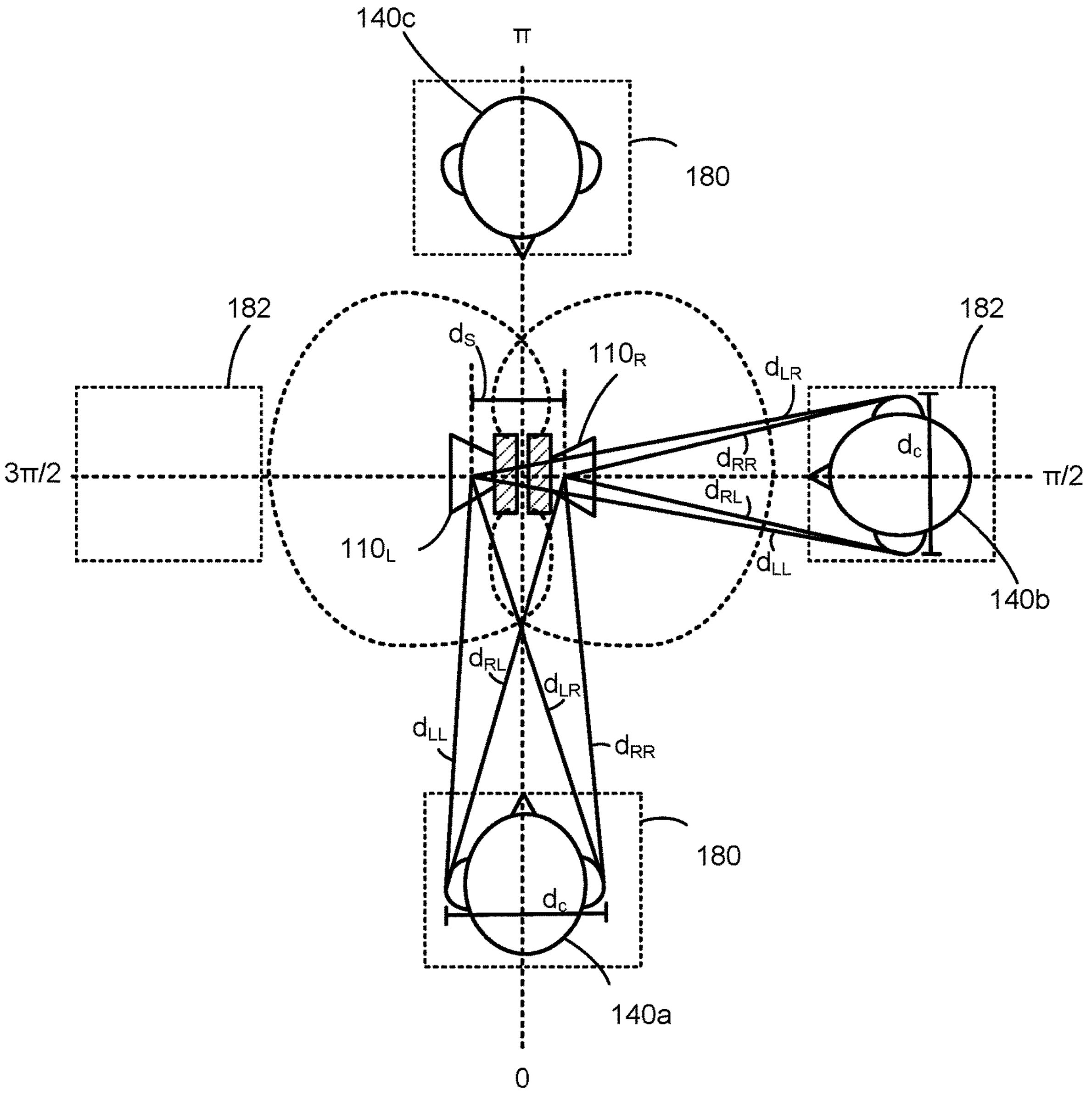
FIGS. 1A, 1, and 1C are examples of opposite facing speaker configurations, in accordance with some embodiments.
Figure 1B:
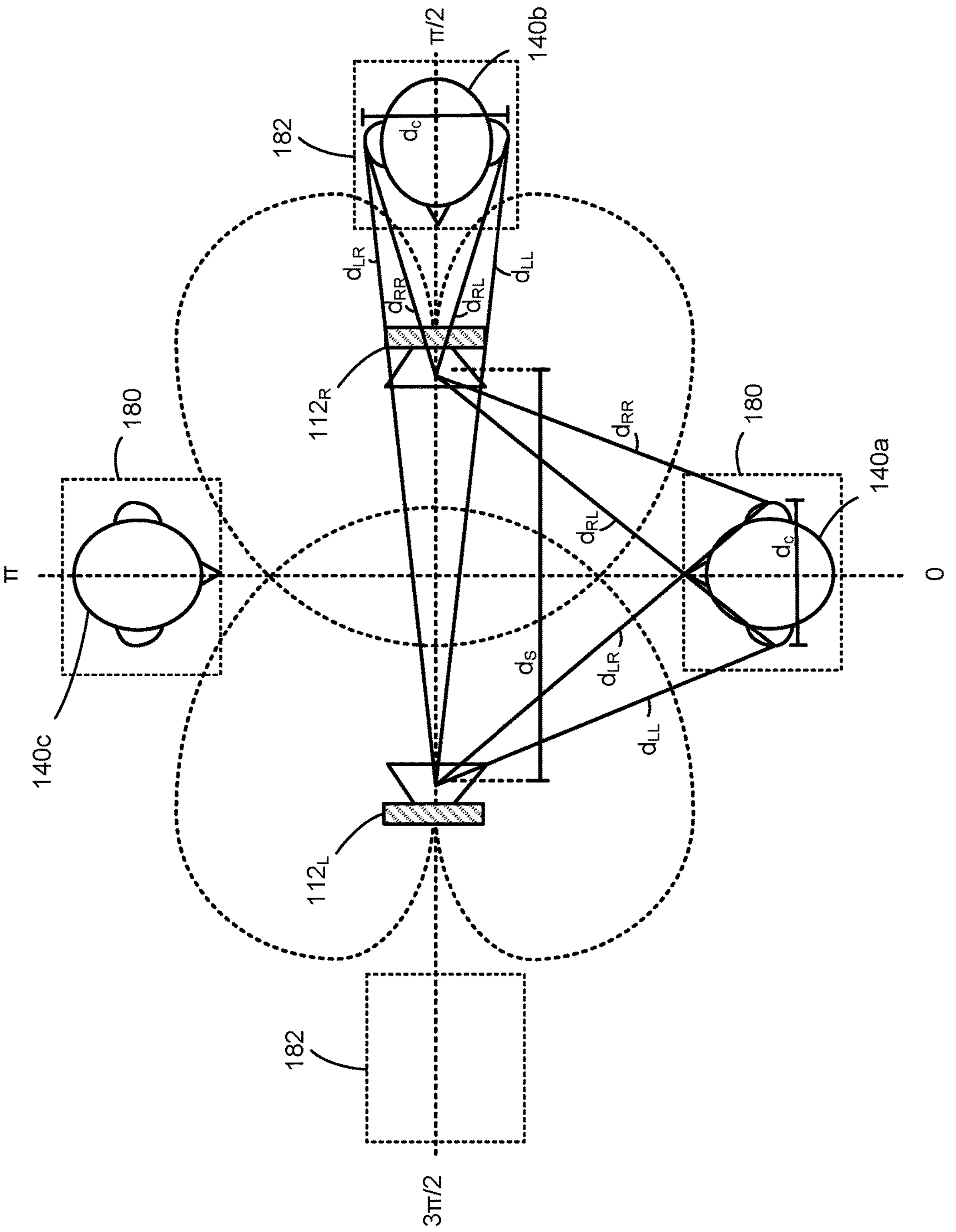
Figure 1C:
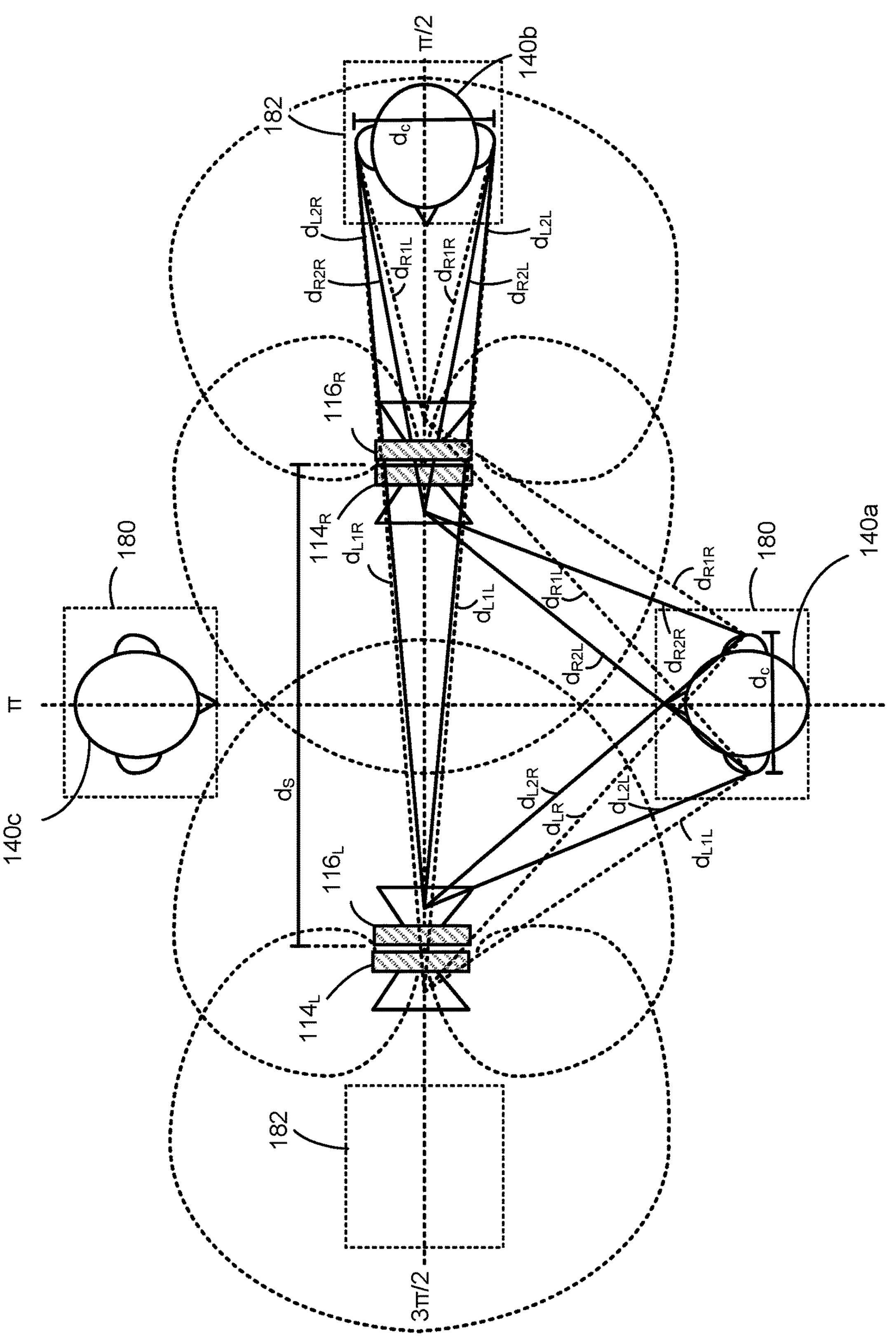

An "opposite facing speaker configuration" refers to multiple (e.g., left and right stereo) speakers that are located at an angle of 180° from each other. FIGS. 1A, 1, and 1C are examples of opposite facing speaker configurations, in accordance with some embodiments. With reference to FIG. 1A, the speakers 110$_L$ and 110$_R$ are placed in proximity and oriented with speakers addressing outward, away from each other. With reference to FIG. 1B, the speakers 112$_L$ and 112$_R$ are spaced apart by a distance ds and are oriented with speakers addressing inward, toward each other. With reference to FIG. 1C, the speakers 114$_L$ and 116$_L$ form a left speaker pair, and the speakers 114$_R$ and 116$_R$ form a right speaker pair. Like the speakers 110$_L$ and 110$_R$ shown in FIG. 1A, the speakers 114$_L$ and 116$_L$ address outward with respect to each other. Similarly, the speakers 114$_R$ and 116$_R$ address outward with respect to each other. Like the speakers 112$_L$ and 112$_R$ shown in FIG. 1B, the left speaker pair and the right speaker pair are separated by a distance ds with respect to the speaker 114$_R$ of the right speaker pair, and the speakers 116$_L$ and 114$_R$ address inward with respect to the each other.

With proper tuning, crosstalk cancellation (CTC) processing on an input audio signal for stereo speakers may be performed to generate a stereo output signal for speakers in the opposite facing speaker configuration of FIG. 1A, 1, or 1C. The output signal when reproduced by the speakers provides dramatic spatial impressions from multiple ideal listening locations, and a consistent fill from everywhere else.

For example, each of the opposite facing speaker configurations of FIGS. 1A, 1B, and 1C results in two optimal listening regions 180, centered at $\theta_u$=0 (e.g., as shown by the listener 140*a*) and $\theta_u$=$\pi$ (e.g., as shown by the listener 140*a*), relative to the front of the speaker array. The mono fill regions 182 are centered at $\theta_u$=$\pi$/2 and (e.g., as shown by the listener 140*b*) and $\theta_u$=(3$\pi$)/2. In transition zones defined between optimal listening regions 180 and mono fill regions 182, a gradual collapse of the soundstage and transition to mono fill is perceived.

If the speakers exhibit a pattern ranging from omni to cardioid (i.e. no polarity inversion at $\pi$ radians), as shown in FIGS. 1A, 1B, and 1C, and the housing is constructed to minimize structure- and air-borne coupling, a single-path CTC processing can cancel much of the crosstalk in the optimal listening regions 180. In particular, the CTC processing models off-axis radiation effects. Furthermore, because each speaker would effectively be presenting a combination of the left and right signals as a result of the CTC processing, in points that lie outside of the optimal listening region 180, the spatial effect is replaced with a consistent mono fill.

A related class of speaker configurations may be constructed with the speakers at angles less than 180°, for example, between 30° and 180°. In this case, one of the two optimal listening locations would have privileged status due to the crispness of its imaging, whereas the soundstage presented to the secondary optimal listening location would be somewhat less sharply defined.

Example Audio Processing System

Figure 2:
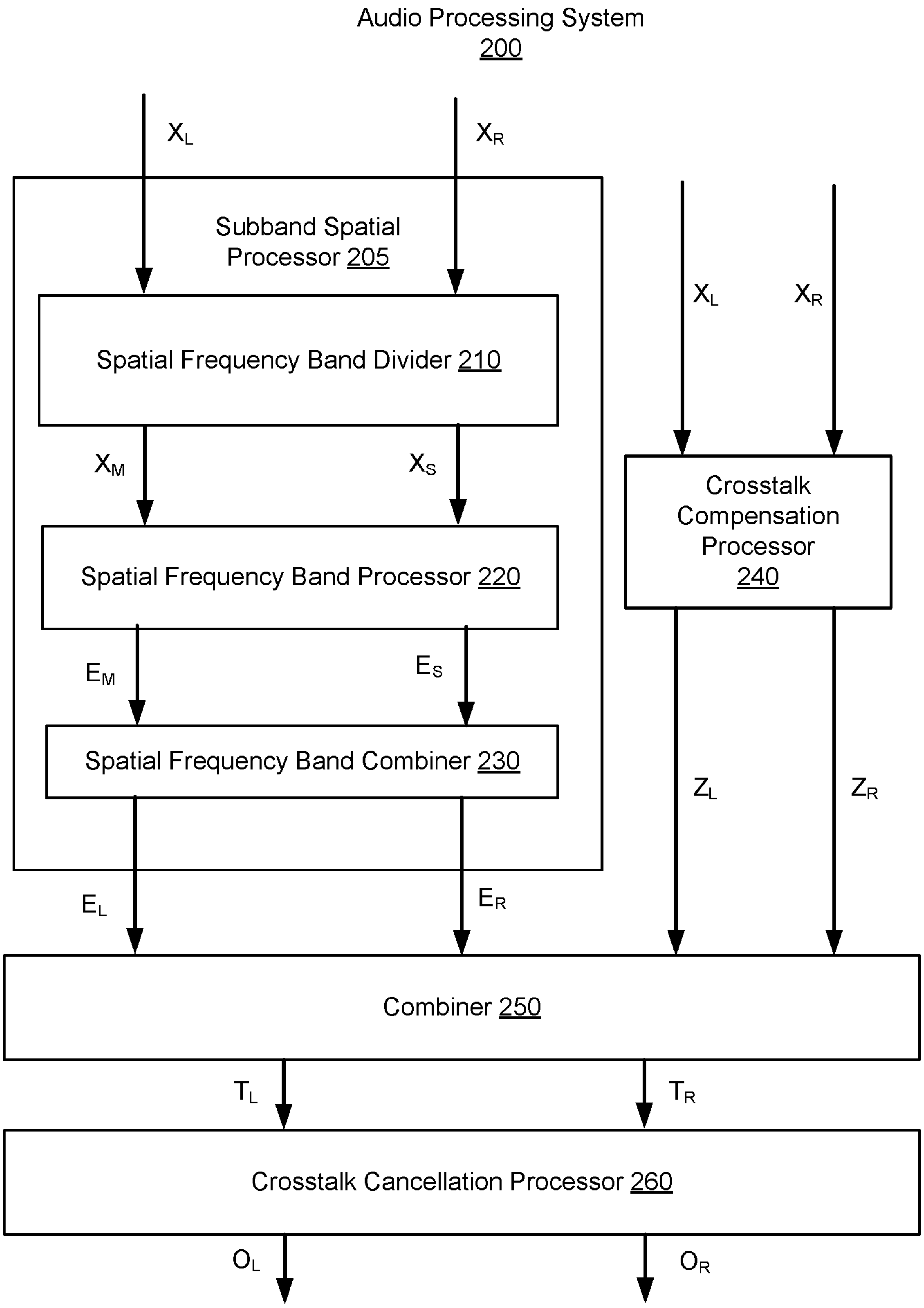
FIG. 2 is a schematic block diagram of an audio processing system, in accordance with some embodiments.

FIG. 2 is a schematic block diagram of an audio processing system 200, in accordance with some embodiments. The system 200 spatially enhances an input audio signal X, and performs crosstalk cancellation on the spatially enhanced audio signal. The system 200 receives an input audio signal X including a left input channel $X_L$ and a right input channel $X_R$, and generates an output audio signal O including a left output channel $O_L$ and a right output channel $O_R$ by processing the input channels $X_L$ and $X_R$. Although not shown in FIG. 2, the spatial enhancement processor 222 may further include an amplifier that amplifies the output audio signal O from the crosstalk cancellation processor 260, and provides the signal O to output devices, such as the opposite facing speakers shown in FIGS. 1A through 1C, that convert the output channels $X_L$ and $X_R$ into sound. For example, the left output channel $O_L$ is provided to the left speaker 110$_L$, and the right output channel $O_R$ is provided to the right speaker 110$_R$ for the opposite facing speaker configuration of FIG. 1A. For the opposite facing speaker configuration of FIG. 1B, the left output channel $O_L$ is provided to the left speaker 112$_L$, and the right output channel $O_R$ is provided to the right speaker 112$_R$. For the opposite facing speaker configuration of FIG. 1C, the left output channel $O_L$ is provided to the left speaker pair including the left speakers $114_L$ and $116_L$, and the right output channel $O_R$ is provided to the right speaker pair including the right speakers $114_R$ and $116_R$.

The system 200 includes a subband spatial processor 205, a crosstalk compensation processor 240, a combiner 250, and a crosstalk cancellation processor 260. The system 200 performs crosstalk compensation and subband spatial processing of the input channels $X_L$ and $X_R$, combines the result of the subband spatial processing with the result of the crosstalk compensation, and then performs a crosstalk cancellation on the combined result.

The subband spatial processor 205 includes a spatial frequency band divider 210, a spatial frequency band processor 220, and a spatial frequency band combiner 230. The spatial frequency band divider 210 is coupled to the input channels $X_L$ and $X_R$ and the spatial frequency band processor 220. The spatial frequency band divider 210 receives the left input channel $X_L$ and the right input channel $X_R$, and processes the input channels into a spatial (or "side") component $X_s$ and a nonspatial (or "mid") component $X_m$. For example, the spatial component $X_s$ can be generated based on a difference between the left input channel $X_L$ and the right input channel $X_R$. The nonspatial component $X_m$ can be generated based on a sum of the left input channel $X_L$ and the right input channel $X_R$. The spatial frequency band divider 210 provides the spatial component $X_s$ and the nonspatial component $X_m$ to the spatial frequency band processor 220.

The spatial frequency band processor 220 is coupled to the spatial frequency band divider 210 and the spatial frequency band combiner 230. The spatial frequency band processor 220 receives the spatial component $X_s$ and the nonspatial component $X_m$ from spatial frequency band divider 210, and enhances the received signals. In particular, the spatial frequency band processor 220 generates an enhanced spatial component $E_s$ from the spatial component $X_s$, and an enhanced nonspatial component $E_m$ from the nonspatial component $X_m$.

For example, the spatial frequency band processor 220 applies subband gains to the spatial component $X_s$ to generate the enhanced spatial component $E_s$, and applies subband gains to the nonspatial component $X_m$ to generate the enhanced nonspatial component $E_m$. In some embodiments, the spatial frequency band processor 220 additionally or alternatively provides subband delays to the spatial component $X_s$ to generate the enhanced spatial component $E_s$, and subband delays to the nonspatial component $X_m$ to generate the enhanced nonspatial component $E_m$. The subband gains and/or delays may can be different for the different (e.g., n) subbands of the spatial component $X_s$ and the nonspatial component $X_m$, or can be the same (e.g., for two or more subbands). The spatial frequency band processor 220 adjusts the gain and/or delays for different subbands of the spatial component $X_s$ and the nonspatial component $X_m$ with respect to each other to generate the enhanced spatial component $E_s$ and the enhanced nonspatial component $E_m$. The spatial frequency band processor 220 then provides the enhanced spatial component $E_s$ and the enhanced nonspatial component $E_m$ to the spatial frequency band combiner 230.

The spatial frequency band combiner 230 is coupled to the spatial frequency band processor 220, and further coupled to the combiner 250. The spatial frequency band combiner 230 receives the enhanced spatial component $E_s$ and the enhanced nonspatial component $E_m$ from the spatial frequency band processor 220, and combines the enhanced spatial component $E_s$ and the enhanced nonspatial component $E_m$ into a left enhanced channel $E_L$ and a right enhanced channel $E_R$. For example, the left enhanced channel $E_L$ can be generated based on a sum of the enhanced spatial component $E_s$ and the enhanced nonspatial component $E_m$, and the right enhanced channel $E_R$ can be generated based on a difference between the enhanced nonspatial component $E_m$ and the enhanced spatial component $E_s$. The spatial frequency band combiner 230 provides the left enhanced channel $E_L$ and the right enhanced channel $E_R$ to the combiner 250.

The crosstalk compensation processor 240 performs a crosstalk compensation to compensate for spectral defects or artifacts in the crosstalk cancellation. The crosstalk compensation processor 240 receives the input channels $X_L$ and $X_R$, and performs a processing to compensate for any artifacts in a subsequent crosstalk cancellation of the enhanced nonspatial component $E_m$ and the enhanced spatial component $E_s$ performed by the crosstalk cancellation processor 260. In some embodiments, the crosstalk compensation processor 240 may perform an enhancement on the nonspatial component $X_m$ and the spatial component $X_s$ by applying filters to generate a crosstalk compensation signal Z, including a left crosstalk compensation channel $Z_L$ and a right crosstalk compensation channel $Z_R$. In other embodiments, the crosstalk compensation processor 240 may perform an enhancement on only the nonspatial component $X_m$.

The combiner 250 combines the left enhanced channel $E_L$ with the left crosstalk compensation channel $Z_L$ to generate a left enhanced compensated channel $T_L$, and combines the right enhanced channel $E_R$ with the right crosstalk compensation channel $Z_R$ to generate a right compensation channel $T_R$. The combiner 250 is coupled to the crosstalk cancellation processor 260, and provides the left enhanced compensated channel $T_L$ and the right enhanced compensation channel $T_R$ to the crosstalk cancellation processor 260.

The crosstalk cancellation processor 260 receives the left enhanced compensated channel $T_L$ and the right enhanced compensation channel $T_R$, and performs crosstalk cancellation on the channels $T_L$, $T_R$ to generate the output audio signal O including the left output channel $O_L$ and the right output channel $O_R$.

In some embodiments, the subband spatial processor 205 of the audio processing system 200 may be disabled or operate as a bypass. The audio processing system 200 applies crosstalk cancellation without the spatial enhancement. In some embodiments, the subband spatial processor 205 is omitted from the system 200. The combiner 250 is coupled to the input channels $X_L$ and $X_R$ instead of the output of the subband spatial processor 205, and combines the input channels $X_L$ and $X_R$ with the left crosstalk compensation channel $Z_L$ and the right crosstalk compensation channel $Z_R$ to generate a compensated signal T including the channels $T_L$ and $T_R$. The crosstalk cancellation processor 260 applies crosstalk cancellation on the compensated signal T to generate the output signal O including the output channels $O_L$ and $O_R$.

Additional details regarding the subband spatial processor 205 are discussed below in connection with FIG. 3, additional details regarding the crosstalk compensation processors 240 are discussed below in connection with FIG. 4, and additional details regarding the crosstalk cancellation processor 260 are discussed below in connection with FIG. 5.

Example Subband Spatial Processor

Figure 3:
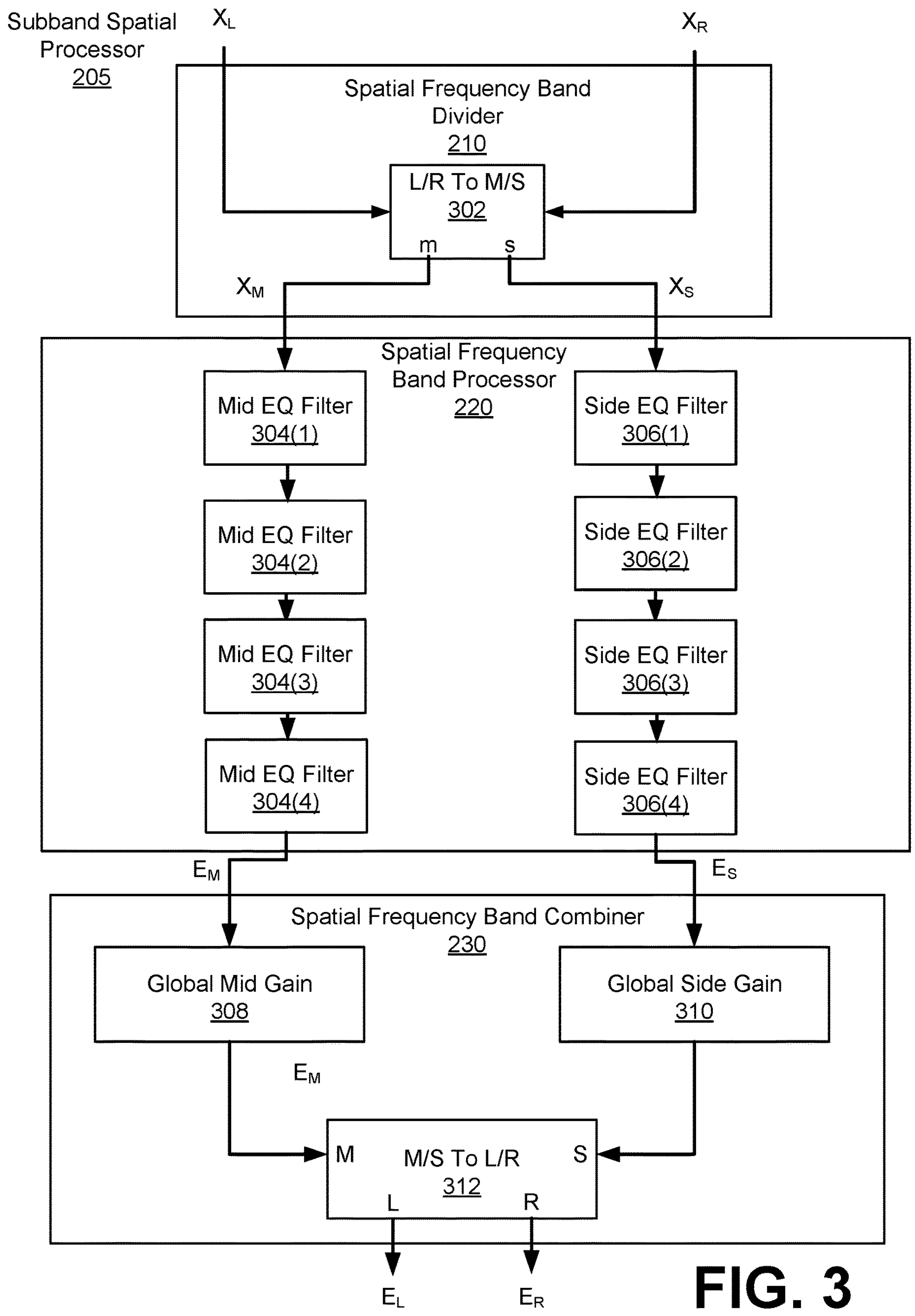
FIG. 3 is a schematic block diagram of a subband spatial processor, in accordance with some embodiments.

FIG. 3 is a schematic block diagram of a subband spatial processor 205, in accordance with some embodiments. The subband spatial processor 205 includes the spatial frequency band divider 210, the spatial frequency band processor 220, and the spatial frequency band combiner 230. The spatial frequency band divider 210 is coupled to the spatial frequency band processor 220, and the spatial frequency band processor 220 is coupled to the spatial frequency band combiner 230.

The spatial frequency band divider 210 includes an L/R to M/S converter 302 that receives the left input channel $X_L$ and a right input channel $X_R$, and converts these inputs into the spatial component $X_m$ and the nonspatial component $X_s$. The spatial component $X_s$ may be generated by subtracting the left input channel $X_L$ and right input channel $X_R$. The nonspatial component $X_m$ may be generated by adding the left input channel $X_L$ and the right input channel $X_R$.

The spatial frequency band processor 220 receives the nonspatial component $X_m$ and applies a set of subband filters to generate the enhanced nonspatial subband component $E_m$. The spatial frequency band processor 220 also receives the spatial subband component $X_s$ and applies a set of subband filters to generate the enhanced nonspatial subband component $E_m$. The subband filters can include various combinations of peak filters, notch filters, low pass filters, high pass filters, low shelf filters, high shelf filters, bandpass filters, bandstop filters, and/or all pass filters.

In some embodiments, the spatial frequency band processor 220 includes a subband filter for each of n frequency subbands of the nonspatial component $X_m$ and a subband filter for each of the n frequency subbands of the spatial component $X_s$. For n=4 subbands, for example, the spatial frequency band processor 220 includes a series of subband filters for the nonspatial component $X_m$ including a mid equalization (EQ) filter 304(1) for the subband (1), a mid EQ filter 304(2) for the subband (2), a mid EQ filter 304(3) for the subband (3), and a mid EQ filter 304(4) for the subband (4). Each mid EQ filter 304 applies a filter to a frequency subband portion of the nonspatial component $X_m$ to generate the enhanced nonspatial component $E_m$.

The spatial frequency band processor 220 further includes a series of subband filters for the frequency subbands of the spatial component $X_s$, including a side equalization (EQ) filter 306(1) for the subband (1), a side EQ filter 306(2) for the subband (2), a side EQ filter 306(3) for the subband (3), and a side EQ filter 306(4) for the subband (4). Each side EQ filter 306 applies a filter to a frequency subband portion of the spatial component $X_s$ to generate the enhanced spatial component $E_s$.

Each of the n frequency subbands of the nonspatial component $X_m$ and the spatial component $X_s$ may correspond with a range of frequencies. For example, the frequency subband (1) may corresponding to 0 to 300 Hz, the frequency subband (2) may correspond to 300 to 510 Hz, the frequency subband (3) may correspond to 510 to 2700 Hz, and the frequency subband (4) may correspond to 2700 Hz to Nyquist frequency. In some embodiments, the n frequency subbands are a consolidated set of critical bands. The critical bands may be determined using a corpus of audio samples from a wide variety of musical genres. A long term average energy ratio of mid to side components over the 24 Bark scale critical bands is determined from the samples. Contiguous frequency bands with similar long term average ratios are then grouped together to form the set of critical bands. The range of the frequency subbands, as well as the number of frequency subbands, may be adjustable.

In some embodiments, the mid EQ filters 304 or side EQ filters 306 may include a biquad filter, having a transfer function defined by Equation 2:

$$H(z) = \frac{b_0 + b_1 z^{-1} + b_2 z^{-2}}{a_0 + a_1 z^{-1} + a_2 z^{-2}} \quad \text{Eq. (2)}$$

where z is a complex variable. The filter may be implemented using a direct form I topology as defined by Equation 3:

$$Y[n] = \frac{b_0}{a_0}X[n-1] + \frac{b_1}{a_0}X[n-1] + \frac{b_2}{a_0}X[n-2] - \frac{a_1}{a_0}Y[n-1] - \frac{a_2}{a_0}Y[n-2] \quad \text{Eq. (3)}$$

where X is the input vector, and Y is the output. Other topologies might have benefits for certain processors, depending on their maximum word-length and saturation behaviors.

The biquad can then be used to implement any second-order filter with real-valued inputs and outputs. To design a discrete-time filter, a continuous-time filter is designed and transformed it into discrete time via a bilinear transform. Furthermore, compensation for any resulting shifts in center frequency and bandwidth may be achieved using frequency warping.

For example, a peaking filter may include an S-plane transfer function defined by Equation 4:

$$H(s) = \frac{s^2 + s\left(\frac{A}{Q}\right) + 1}{s^2 + s\left(\frac{A}{Q}\right) + 1} \quad \text{Eq. (4)}$$

where s is a complex variable, A is the amplitude of the peak, and Q is the filter "quality" (canonically derived as:

$$Q = \frac{f_c}{\Delta f}).$$

The digital filters coefficients are:

$$b_0 = 1 + \alpha A$$

$$b_1 = -2 * \cos(\omega_0)$$

$$b_2 = 1 - \alpha A$$

$$a_0 = 1 + \frac{\alpha}{A}$$

$$a_1 = -2\cos(\omega_0)$$

$$a_2 = 1 + \frac{\alpha}{A}$$

where $\omega_0$ is the center frequency of the filter in radians and $$\alpha = \frac{\sin(\omega_0)}{2Q}.$$

The spatial frequency band combiner 230 receives mid and side components, applies gains to each of the components, and converts the mid and side components into left and right channels. For example, the spatial frequency band combiner 230 receives the enhanced nonspatial component $E_m$ and the enhanced spatial component $E_s$, and performs global mid and side gains before converting the enhanced nonspatial component $E_m$ and the enhanced spatial component $E_s$ into the left spatially enhanced channel $E_L$ and the right spatially enhanced channel $E_R$.

More specifically, the spatial frequency band combiner 230 includes a global mid gain 308, a global side gain 310, and an M/S to L/R converter 312 coupled to the global mid gain 308 and the global side gain 310. The global mid gain 308 receives the enhanced nonspatial component $E_m$ and applies a gain, and the global side gain 310 receives the enhanced spatial component $E_s$ and applies a gain. The M/S to L/R converter 312 receives the enhanced nonspatial component $E_m$ from the global mid gain 308 and the enhanced spatial component $E_s$ from the global side gain 310, and converts these inputs into the left enhanced channel $E_L$ and the right enhanced channel $E_R$.

Figure 4:
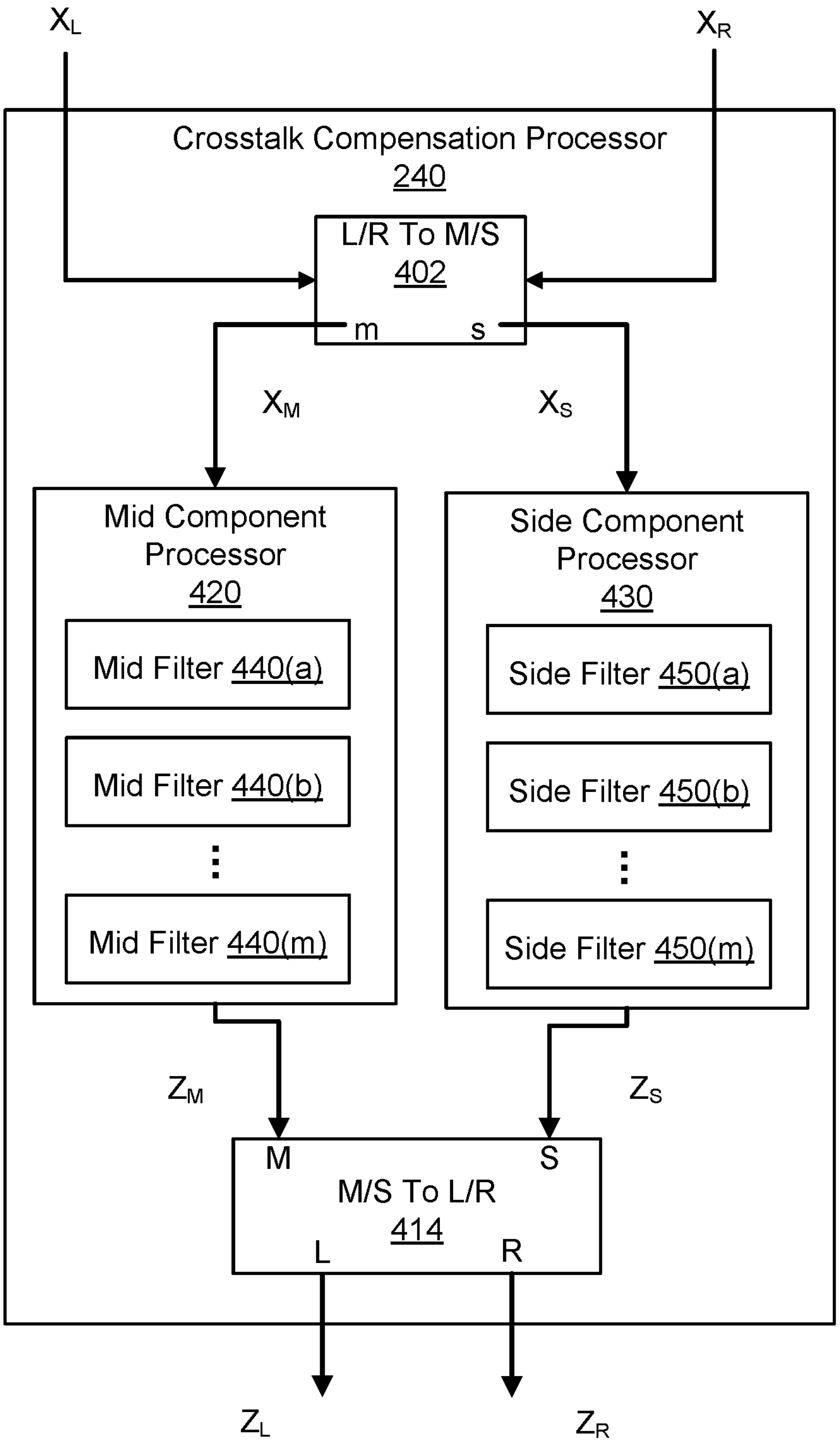
FIG. 4 is a schematic block diagram of a crosstalk compensation processor, in accordance with some embodiments.

FIG. 4 is a schematic block diagram of a crosstalk compensation processor 240, in accordance with some embodiments. The crosstalk compensation processor 240 receives left and right input channels $X_L$ and $X_R$, and generates left and right output channels by applying a crosstalk compensation on the input channels. The crosstalk compensation processer 240 includes a L/R to M/S converter 402, a mid component processor 420, a side component processor 430, and an M/S to L/R converter 414.

The crosstalk compensation processor 240 receives the input channels $HF_L$ and $HF_R$, and performs a preprocessing to generate the left crosstalk compensation channel $Z_L$ and the right crosstalk compensation channel $Z_R$. The channels $Z_L$, $Z_R$ may be used to compensate for any artifacts in crosstalk processing, such as crosstalk cancellation. The L/R to M/S converter 402 receives the left channel $X_L$ and the right channel $X_R$, and generates the nonspatial component $X_m$ and the spatial component $X_s$ of the input channels $X_L$, $X_R$. The left and right channels may be summed to generate the nonspatial component of the left and right channels, and subtracted to generate the spatial component of the left and right channels.

The mid component processor 420 includes a plurality of filters 440, such as m mid filters 440(*a*), 440(*b*), through 440(*m*). Here, each of the m mid filters 440 processes one of m frequency bands of the nonspatial component $X_m$ and the spatial component $X_s$. The mid component processor 420 generates a mid crosstalk compensation channel $Z_m$ by processing the nonspatial component $X_m$. In some embodiments, the mid filters 440 are configured using a frequency response plot of the nonspatial $X_m$ with crosstalk processing through simulation. In addition, by analyzing the frequency response plot, any spectral defects such as peaks or troughs in the frequency response plot over a predetermined threshold (e.g., 10 dB) occurring as an artifact of the crosstalk processing can be estimated. These artifacts result primarily from the summation of the delayed and inverted contralateral signals with their corresponding ipsilateral signal in the crosstalk processing, thereby effectively introducing a comb filter-like frequency response to the final rendered result. The mid crosstalk compensation channel $Z_m$ can be generated by the mid component processor 420 to compensate for the estimated peaks or troughs, where each of the m frequency bands corresponds with a peak or trough. Specifically, based on the specific delay, filtering frequency, and gain applied in the crosstalk processing, peaks and troughs shift up and down in the frequency response, causing variable amplification and/or attenuation of energy in specific regions of the spectrum. Each of the mid filters 440 may be configured to adjust for one or more of the peaks and troughs.

The side component processor 430 includes a plurality of filters 450, such as m side filters 450(*a*), 450(*b*) through 450(*m*). The side component processor 430 generates a side crosstalk compensation channel $Z_s$ by processing the spatial component $X_s$. In some embodiments, a frequency response plot of the spatial $X_s$ with crosstalk processing can be obtained through simulation. By analyzing the frequency response plot, any spectral defects such as peaks or troughs in the frequency response plot over a predetermined threshold (e.g., 10 dB) occurring as an artifact of the crosstalk processing can be estimated. The side crosstalk compensation channel $Z_s$ can be generated by the side component processor 430 to compensate for the estimated peaks or troughs. Specifically, based on the specific delay, filtering frequency, and gain applied in the crosstalk processing, peaks and troughs shift up and down in the frequency response, causing variable amplification and/or attenuation of energy in specific regions of the spectrum. Each of the side filters 450 may be configured to adjust for one or more of the peaks and troughs. In some embodiments, the mid component processor 420 and the side component processor 430 may include a different number of filters.

In some embodiments, the mid filters 440 and side filters 450 may include a biquad filter having a transfer function defined by Equation 5:

$$H(z) = \frac{b_0 + b_1 z^{-1} + b_2 z^{-2}}{a_0 + a_1 z^{-1} + a_2 z^{-2}} \qquad \text{Eq. (5)}$$

where z is a complex variable, and $a_0$, $a_1$, $a_2$, $b_0$, $b_1$, and $b_2$ are digital filter coefficients. One way to implement such a filter is the direct form I topology as defined by Equation 6:

$$Y[n] = \frac{b_0}{a_0}X[n-1] + \frac{b_1}{a_0}X[n-1] + \frac{b_2}{a_0}X[n-2] - \frac{a_1}{a_0}Y[n-1] - \frac{a_2}{a_0}Y[n-2] \qquad \text{Eq. (6)}$$

where X is the input vector, and Y is the output. Other topologies may be used, depending on their maximum word-length and saturation behaviors.

The biquad can then be used to implement a second-order filter with real-valued inputs and outputs. To design a discrete-time filter, a continuous-time filter is designed, and then transformed into discrete time via a bilinear transform. Furthermore, resulting shifts in center frequency and bandwidth may be compensated using frequency warping.

For example, a peaking filter may have an S-plane transfer function defined by Equation 7:

$$H(s) = \frac{s^2 + s\left(\frac{A}{Q}\right) + 1}{s^2 + s\left(\frac{A}{Q}\right) + 1} \qquad \text{Eq. (7)}$$

where s is a complex variable, A is the amplitude of the peak, and Q is the filter "quality," and and the digital filter coefficients are defined by:

$$b_0 = 1 + \alpha A$$

$$b_1 = -2 * \cos(\omega_0)$$

$$b_2 = 1 - \alpha A$$

$$a_0 = 1 + \frac{\alpha}{A}$$

$$a_1 = -2\cos(\omega_0)$$

$$a_2 = 1 + \frac{\alpha}{A}$$

where $\omega_0$ is the center frequency of the filter in radians and $$\alpha = \frac{\sin(\omega_0)}{2Q}.$$

Furthermore, the filter quality Q may be defined by Equation 8:

$$Q = \frac{f_c}{\Delta f} \quad \text{Eq. (8)}$$

where $\Delta f$ is a bandwidth and $f_c$ is a center frequency.

The M/S to L/R converter 414 receives the mid crosstalk compensation channel $Z_m$ and the side crosstalk compensation channel $Z_s$, and generates the left crosstalk compensation channel $Z_L$ and the right crosstalk compensation channel $Z_R$. In general, the mid and side channels may be summed to generate the left channel of the mid and side components, and the mid and side channels may be subtracted to generate right channel of the mid and side components.

Example Crosstalk Cancellation Processor

Figure 5:
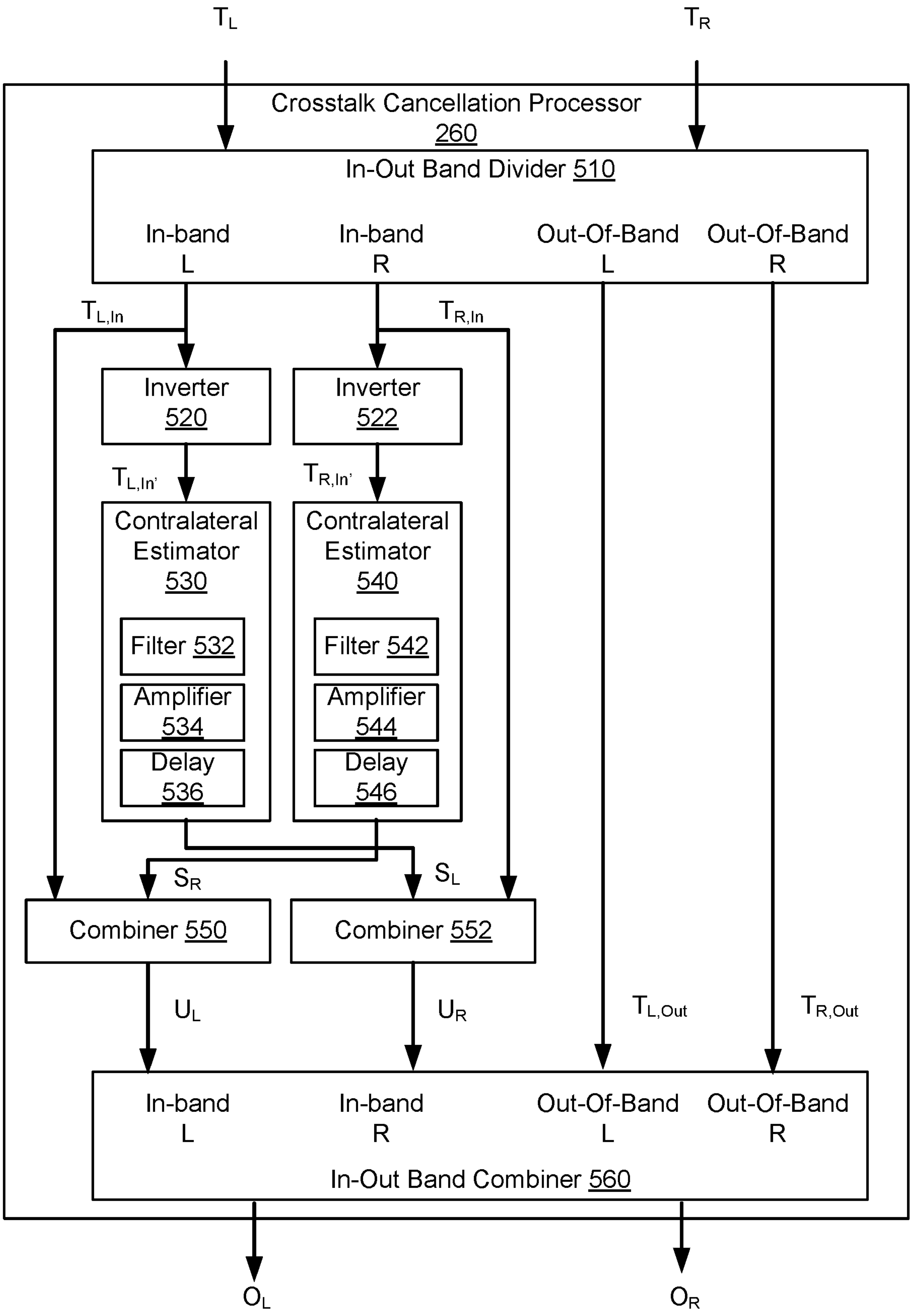
FIG. 5 is a schematic block diagram of a crosstalk cancellation processor, in accordance with some embodiments.

FIG. 5 is a schematic block diagram of a crosstalk cancellation processor 260, in accordance with some embodiments. The crosstalk cancellation processor 260 receives the left enhanced compensation channel $T_L$ and the right enhanced compensation channel $T_R$ from the combiner 250, and performs crosstalk cancellation on the channels $T_L$, $T_R$ to generate the left output channel $O_L$, and the right output channel $O_R$.

The crosstalk cancellation processor 260 includes an in-out band divider 510, inverters 520 and 522, contralateral estimators 530 and 540, combiners 550 and 552, and an in-out band combiner 560. These components operate together to divide the input channels $T_L$, $T_R$ into in-band components and out-of-band components, and perform a crosstalk cancellation on the in-band components to generate the output channels $O_L$, $O_R$.

By dividing the input audio signal T into different frequency band components and by performing crosstalk cancellation on selective components (e.g., in-band components), crosstalk cancellation can be performed for a particular frequency band while obviating degradations in other frequency bands. If crosstalk cancellation is performed without dividing the input audio signal T into different frequency bands, the audio signal after such crosstalk cancellation may exhibit significant attenuation or amplification in the nonspatial and spatial components in low frequency (e.g., below 350 Hz), higher frequency (e.g., above 12000 Hz), or both. By selectively performing crosstalk cancellation for the in-band (e.g., between 250 Hz and 14000 Hz), where the vast majority of impactful spatial cues reside, a balanced overall energy, particularly in the nonspatial component, across the spectrum in the mix can be retained.

The in-out band divider 510 separates the input channels $T_L$, $T_R$ into in-band channels $T_{L,In}$, $T_{R,In}$ and out of band channels $T_{L,Out}$, $T_{R,Out}$, respectively. Particularly, the in-out band divider 510 divides the left enhanced compensation channel $T_L$ into a left in-band channel $T_{L,In}$ and a left out-of-band channel $T_{L,Out}$. Similarly, the in-out band divider 510 separates the right enhanced compensation channel $T_R$ into a right in-band channel $T_{R,In}$ and a right out-of-band channel $T_{R,Out}$. Each in-band channel may encompass a portion of a respective input channel corresponding to a frequency range including, for example, 250 Hz to 14 kHz. The range of frequency bands may be adjustable, for example according to speaker parameters.

The inverter 520 and the contralateral estimator 530 operate together to generate a left contralateral cancellation component $S_L$ to compensate for a contralateral sound component due to the left in-band channel $T_{L,In}$. Similarly, the inverter 522 and the contralateral estimator 540 operate together to generate a right contralateral cancellation component $S_R$ to compensate for a contralateral sound component due to the right in-band channel $T_{R,In}$.

In one approach, the inverter 520 receives the in-band channel $T_{L,In}$ and inverts a polarity of the received in-band channel $T_{L,In}$ to generate an inverted in-band channel $T_{L,In}'$. The contralateral estimator 530 receives the inverted in-band channel $T_{L,In}'$, and extracts a portion of the inverted in-band channel $T_{L,In}'$ corresponding to a contralateral sound component through filtering. Because the filtering is performed on the inverted in-band channel $T_{L,In}'$, the portion extracted by the contralateral estimator 530 becomes an inverse of a portion of the in-band channel $T_{L,In}$ attributing to the contralateral sound component. Hence, the portion extracted by the contralateral estimator 530 becomes a left contralateral cancellation component $S_L$, which can be added to a counterpart in-band channel $T_{R,In}$ to reduce the contralateral sound component due to the in-band channel $T_{L,In}$. In some embodiments, the inverter 520 and the contralateral estimator 530 are implemented in a different sequence.

The inverter 522 and the contralateral estimator 540 perform similar operations with respect to the in-band channel $T_{R,In}$ to generate the right contralateral cancellation component $S_R$. Therefore, detailed description thereof is omitted herein for the sake of brevity.

In one example implementation, the contralateral estimator 530 includes a filter 532, an amplifier 534, and a delay unit 536. The filter 532 receives the inverted input channel $T_{L,In}'$ and extracts a portion of the inverted in-band channel $T_{L,In}'$ corresponding to a contralateral sound component through a filtering function. An example filter implementation is a Notch or Highshelf filter with a center frequency selected between 5000 and 10000 Hz, and Q selected between 0.5 and 1.0. Gain in decibels ($G_{dB}$) may be derived from Equation 9:

$$G_{dB} = -3.0 - \log_{1.333}(D) \quad \text{Eq. (9)}$$

where D is a delay amount by delay unit 536 in samples, for example, at a sampling rate of 48 KHz. An alternate implementation is a Lowpass filter with a corner frequency selected between 5000 and 10000 Hz, and Q selected between 0.5 and 1.0. Moreover, the amplifier 534 amplifies the extracted portion by a corresponding gain coefficient $G_{L,In}$, and the delay unit 536 delays the amplified output from the amplifier 534 according to a delay function D to generate the left contralateral cancellation component $S_L$. The contralateral estimator 540 includes a filter 542, an amplifier 544, and a delay unit 546 that performs similar operations on the inverted in-band channel $T_{R,In}'$ to generate the right contralateral cancellation component $S_R$. In one example, the contralateral estimators 530, 540 generate the left contralateral cancellation components $S_L$, $S_R$, according to equations below:

$$S_L=D[G_{L,In}*F[T_{L,In}']] \quad \text{Eq. (10)}$$

$$S_R=D[G_{R,In}*F[T_{R,In}']] \quad \text{Eq. (11)}$$

where F[ ] is a filter function, and D[ ] is the delay function.

The configurations of the crosstalk cancellation can be determined by the speaker parameters. In one example, filter center frequency, delay amount, amplifier gain, and filter gain can be determined, according to an angle formed between two speakers with respect to a listener (e.g., the listener 140*a*). In some embodiments, values between the speaker angles are used to interpolate other values. In some embodiments, the perceived "origin" of sound from a speaker may be spatially different from the actual speaker cone, such as may result from orthogonal speaker orientation relative to the listener's head. Here, the configuration of the crosstalk cancellation may be tuned based on the perceived angle, rather than the actual angle of the speakers with respect to the listener.

The combiner 550 combines the right contralateral cancellation component $S_R$ to the left in-band channel $T_{L,In}$ to generate a left in-band compensation channel $U_L$, and the combiner 552 combines the left contralateral cancellation component $S_L$ to the right in-band channel $T_{R,In}$ to generate a right in-band compensation channel $U_R$. The in-out band combiner 560 combines the left in-band compensation channel $U_L$ with the out-of-band channel $T_{L,Out}$ to generate the left output channel $O_L$, and combines the right in-band compensation channel $U_R$ with the out-of-band channel $T_{R,Out}$ to generate the right output channel $O_R$.

Accordingly, the left output channel $O_L$ includes the right contralateral cancellation component $S_R$ corresponding to an inverse of a portion of the in-band channel $T_{R,In}$ attributing to the contralateral sound, and the right output channel $O_R$ includes the left contralateral cancellation component $S_L$ corresponding to an inverse of a portion of the in-band channel $T_{L,In}$ attributing to the contralateral sound. In this configuration, a wavefront of an ipsilateral sound component output by the speaker $\mathbf{110}_R$ according to the right output channel $O_R$ arrived at the right ear can cancel a wavefront of a contralateral sound component output by the loudspeaker $\mathbf{110}_L$ according to the left output channel $O_L$. Similarly, a wavefront of an ipsilateral sound component output by the speaker $\mathbf{110}_L$ according to the left output channel $O_L$ arrived at the left ear can cancel a wavefront of a contralateral sound component output by the speaker $\mathbf{110}_R$ according to right output channel $O_R$. Thus, contralateral sound components can be reduced to enhance spatial detectability.

Additional details regarding subband spatial processing and crosstalk cancellation are discussed in U.S. patent application Ser. No. 15/409,278, filed Jan. 18, 2017, U.S. patent application Ser. No. 15/404,948, filed Jan. 12, 2017, and U.S. patent Ser. No. 15/646,821, filed Jul. 11, 2017, each incorporated by reference in its entirety.

Example Audio System Processing

Figure 6:
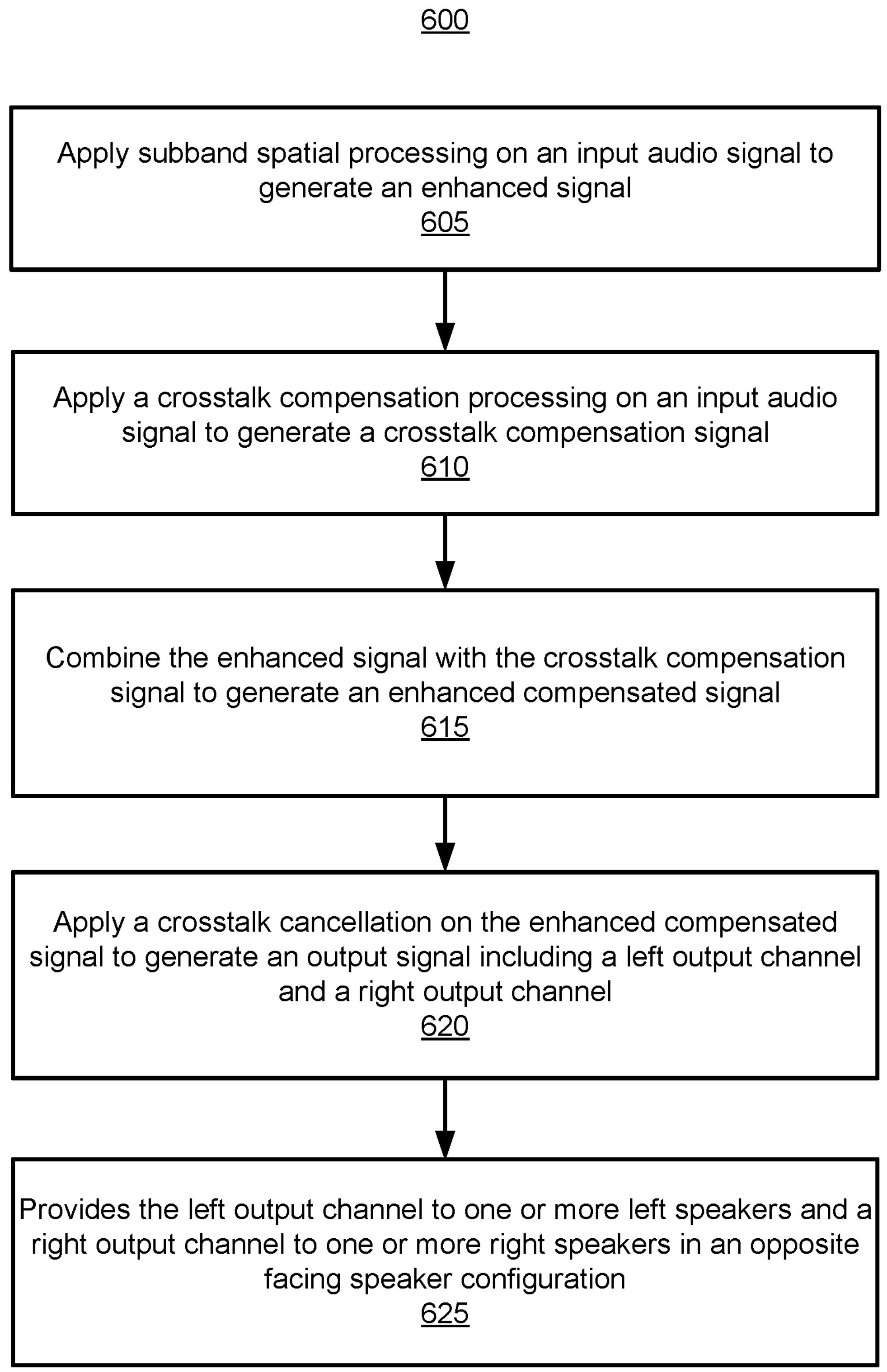
FIG. 6 is a flow chart of a process for performing subband spatial enhancement and crosstalk cancellation on an input audio signal for opposite facing speakers, in accordance with some embodiments.

FIG. 6 is a flow chart of a process 600 for performing subband spatial enhancement and crosstalk cancellation on an input audio signal for opposite facing speakers, in accordance with some embodiments. The process 600 is discussed as being performed by the audio processing system 200, although other types of computing devices or circuitry may be used. The process 600 may include fewer or additional steps, and steps may be performed in different orders.

The audio processing system 200 (e.g., subband spatial processor 205) applies 605 a subband spatial processing on an input audio signal X to generate an enhanced signal E. For example, the subband spatial processor 205 applies subband gains to the spatial or side component $X_s$ to generate the enhanced spatial component $E_s$, and applies subband gains to the nonspatial or mid component $X_m$ to generate the enhanced nonspatial component $E_m$.

The audio processing system 200 (e.g., crosstalk compensation processor 240) applies 610 a crosstalk compensation processing on an input audio signal X to generate a crosstalk compensation signal Z. For example, the crosstalk compensation processor 240 applies filters to the nonspatial component $X_m$ of the input channels $X_L$, $X_R$, and applies filters to the spatial component $X_s$ of the input channels $X_L$, $X_R$. These filters adjust for spectral defects that may be caused by crosstalk cancellation or other crosstalk processing.

The audio processing system 200 (e.g., combiner 250) combines 615 the enhanced signal E with the crosstalk compensation signal Z to generate an enhanced compensated signal T. The enhanced compensated signal T includes the spatial enhancement of the enhanced signal E, adjusted for the crosstalk cancellation by the crosstalk compensation signal Z.

The audio processing system 200 (e.g., crosstalk cancellation processor 260) applies 620 a crosstalk cancellation on the enhanced compensated signal T to generate an output signal O including a left output channel $O_L$ and a right output channel $O_R$. For example, the crosstalk cancellation processor 260 receives the left enhanced compensation channel $T_L$ and the right enhanced compensation channel $T_R$. The crosstalk cancellation processor 260 separates the left enhanced compensation channel $T_L$ into a left inband signal and a left out-of-band signal, and separates the right enhanced compensation channel $T_R$ into a right inband signal and a right out-of-band signal. The crosstalk cancellation processor 260 generates a left crosstalk cancellation component by filtering and time delaying the left inband signal, and generates generate a right crosstalk cancellation component by filtering and time delaying the right inband signal. The crosstalk cancellation processor 260 generates the left output channel $O_L$ by combining the right crosstalk cancellation component with the left inband signal and the left out-of-band signal, and generates the right output channel $O_R$ by combining the left crosstalk cancellation component with the right inband signal and the right out-of-band signal.

The audio processing system 200 provides 625 the left output channel $O_L$ to one or more left speakers and a right output channel $O_R$ to one or more right speakers in an opposite facing speaker configuration.

Figure 7:
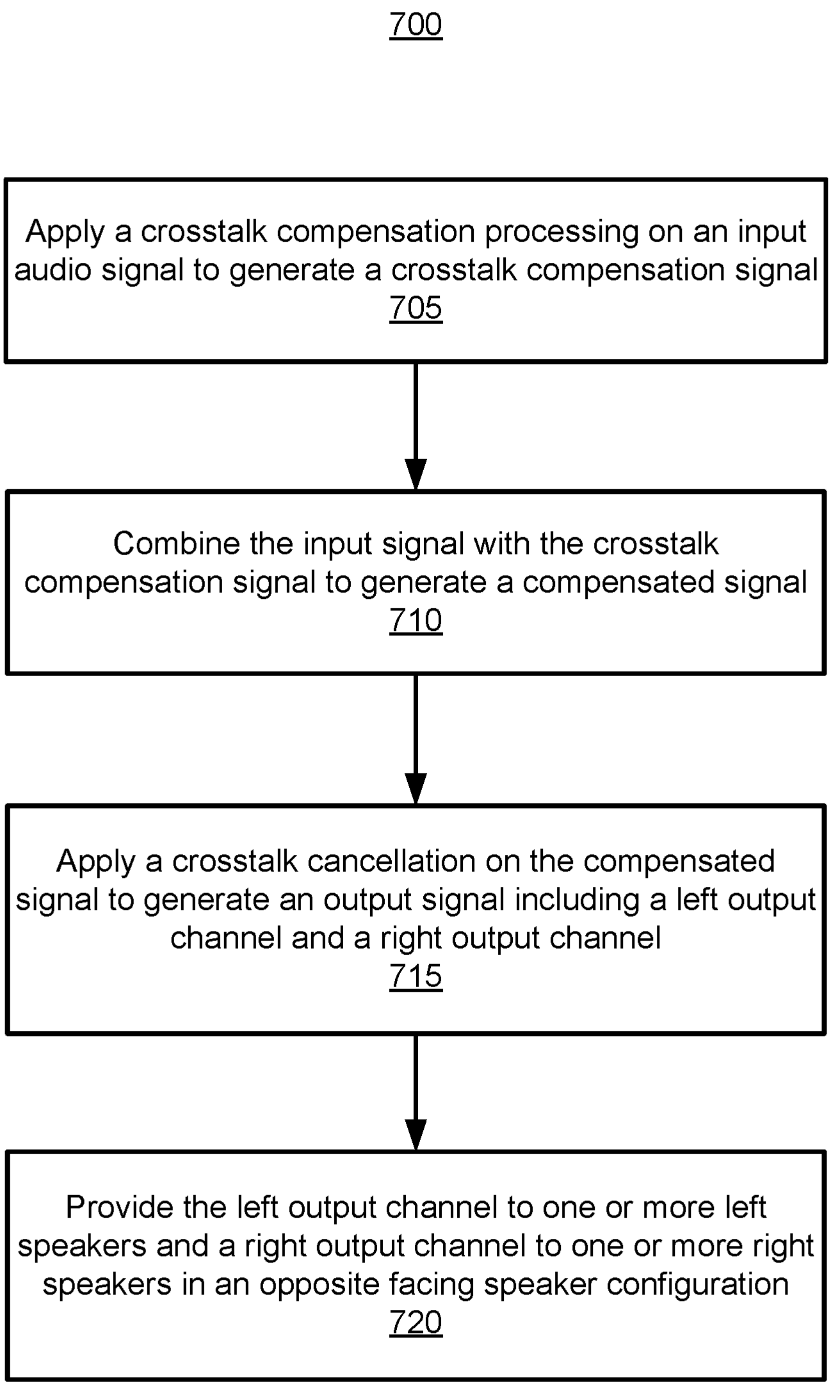
FIG. 7 is a flow chart of a process for performing crosstalk cancellation on an input audio signal for opposite facing speakers, in accordance with some embodiments.

FIG. 7 is a flow chart of a process 700 for performing crosstalk cancellation on an input audio signal for opposite facing speakers, in accordance with some embodiments. The process 700 is discussed as being performed by the audio processing system 200, although other types of computing devices or circuitry may be used. The process 700 may include fewer or additional steps, and steps may be performed in different orders. Unlike the process 600, the process 700 does not include a subband spatial processing.

The audio processing system 200 (e.g., crosstalk compensation processor 240) applies 705 a crosstalk compensation processing on an input audio signal X to generate a crosstalk compensation signal Z.

The audio processing system 200 (e.g., combiner 250) combines 710 the input signal X with the crosstalk compensation signal Z to generate a compensated signal T. Here, the subband spatial processing is not performed to generate the enhanced signal E from the input signal X. Instead, the crosstalk compensation signal Z is combined with the input signal X. The subband spatial processor 205 of the audio processing system 200 may be disabled or operate as a bypass. In some embodiments, the subband spatial processor 205 is omitted from the system 200.

The audio processing system 200 (e.g., crosstalk cancellation processor 260) applies 715 a crosstalk cancellation on the compensation signal T to generate an output signal O including a left output channel $O_L$ and a right output channel $O_R$. For example, the crosstalk cancellation processor 270 receives a left compensation channel $T_L$ and a right compensation channel $T_R$ of the compensation signal T. The crosstalk cancellation processor 260 separates the left compensation channel $T_L$ into a left inband signal and a left out-of-band signal, and separates the right compensation channel $T_R$ into a right inband signal and a right out-of-band signal. The crosstalk cancellation processor 260 generates a left crosstalk cancellation component by filtering and time delaying the left inband signal, and generates generate a right crosstalk cancellation component by filtering and time delaying the right inband signal. The crosstalk cancellation processor 260 generates the left output channel $O_L$ by combining the right crosstalk cancellation component with the left inband signal and the left out-of-band signal, and generates the right output channel $O_R$ by combining the left crosstalk cancellation component with the right inband signal and the right out-of-band signal.

The audio processing system 200 provides 720 the left output channel $O_L$ to one or more left speakers and a right output channel $O_R$ to one or more right speakers in an opposite facing speaker configuration.

Example Computing System

It is noted that the systems and processes described herein may be embodied in an embedded electronic circuit or electronic system. The systems and processes also may be embodied in a computing system that includes one or more processing systems (e.g., a digital signal processor) and a memory (e.g., programmed read only memory or programmable solid state memory), or some other circuitry such as an application specific integrated circuit (ASIC) or field-programmable gate array (FPGA) circuit.

Figure 8:
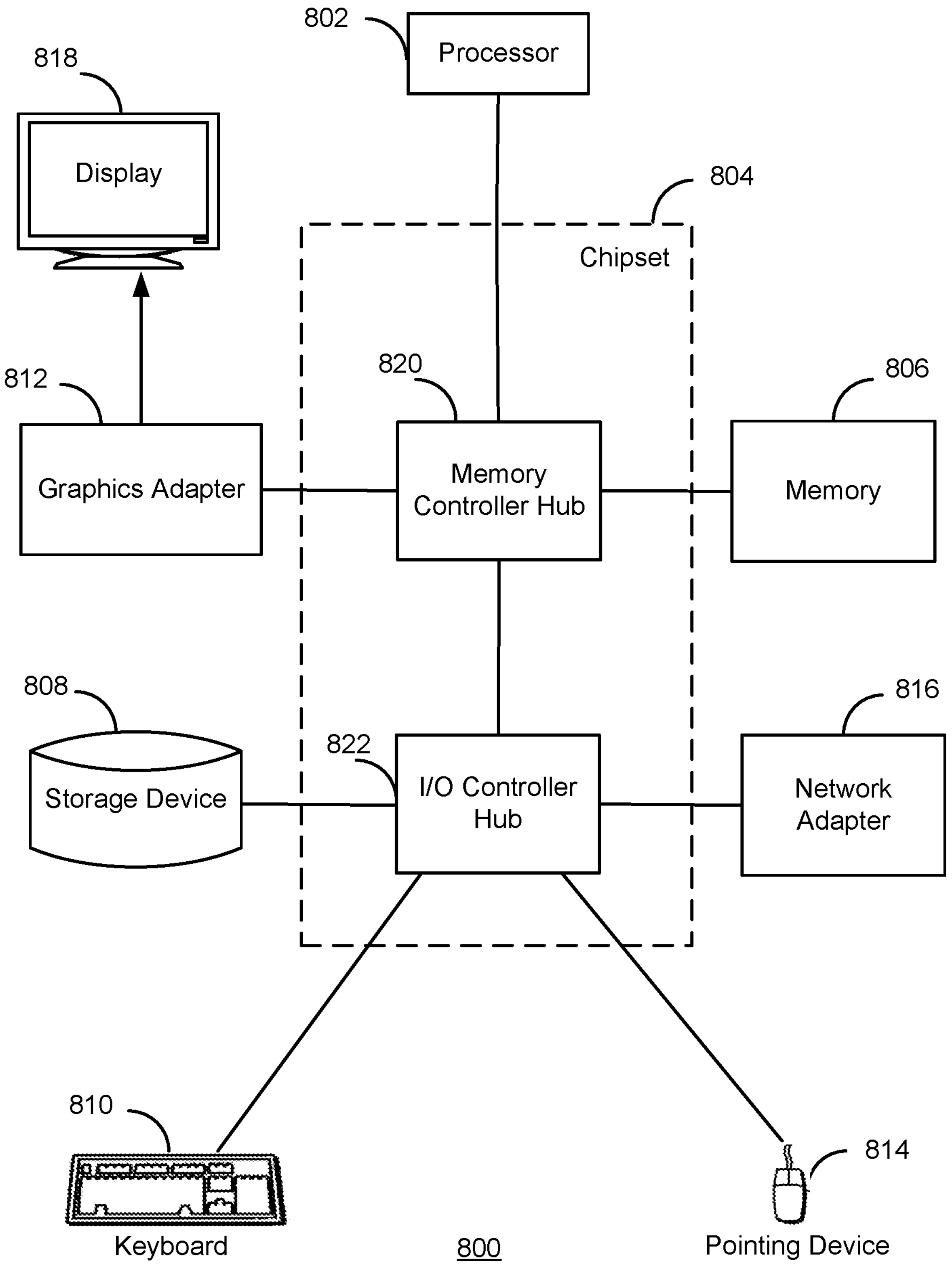
FIG. 8 is a schematic block diagram of a computer system, in accordance with some embodiments.

FIG. 8 illustrates an example of a computer system 800, according to one embodiment. The audio processing system 200 may be implemented on the system 800. Illustrated are at least one processor 802 coupled to a chipset 804. The chipset 804 includes a memory controller hub 820 and an input/output (I/O) controller hub 822. A memory 806 and a graphics adapter 812 are coupled to the memory controller hub 820, and a display device 818 is coupled to the graphics adapter 812. A storage device 808, keyboard 810, pointing device 814, and network adapter 816 are coupled to the I/O controller hub 822. Other embodiments of the computer 800 have different architectures. For example, the memory 806 is directly coupled to the processor 802 in some embodiments.

The storage device 808 includes one or more non-transitory computer-readable storage media such as a hard drive, compact disk read-only memory (CD-ROM), DVD, or a solid-state memory device. The memory 806 holds software (or program code) that may be comprised of one or more instructions and data used by the processor 802. For example, the memory 806 may store instructions that when executed by the processor 802 causes or configures the processor 802 to perform the functionality discussed herein, such as the processes 600 and 700. The pointing device 814 is used in combination with the keyboard 810 to input data into the computer system 800. The graphics adapter 812 displays images and other information on the display device 818. In some embodiments, the display device 818 includes a touch screen capability for receiving user input and selections. The network adapter 816 couples the computer system 800 to a network. Some embodiments of the computer 800 have different and/or other components than those shown in FIG. 8. For example, the computer system 800 may be a server that lacks a display device, keyboard, and other components, or may use other types of input devices.

Additional Considerations

The disclosed configuration may include a number of benefits and/or advantages. For example, an input signal can be output to unmatched loudspeakers while preserving or enhancing a spatial sense of the sound field. A high quality listening experience can be achieved even when the speakers are unmatched or when the listener is not in an ideal listening position relative to the speakers.

Upon reading this disclosure, those of skill in the art will appreciate still additional alternative embodiments the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope described herein.

Any of the steps, operations, or processes described herein may be performed or implemented with one or more hardware or software modules, alone or in combination with other devices. In one embodiment, a software module is implemented with a computer program product comprising a computer readable medium (e.g., non-transitory computer readable medium) containing computer program code, which can be executed by a computer processor for performing any or all of the steps, operations, or processes described.

What is claimed is:

1. A system for audio processing, comprising:

a left speaker and a right speaker addressing outward with respect to each other;

a subband spatial processor configured to execute stored instructions to:

receive an input audio signal comprising a left channel and a right channel;

generate a left enhanced channel and a right enhanced channel by gain adjusting side subband components and mid subband components of the left and right input channels; and a crosstalk cancellation processor coupled to the subband spatial processor, the left speaker, and the right speaker, the crosstalk cancellation processor configured to:

generate a cross-talk cancelled left output channel and a cross-talk cancelled right output channel based on left enhanced channel and the right enhanced channel; and provide the left output channel to the left speaker and the right output channel to the right speaker to generate a sound providing a plurality of crosstalk cancelled listening regions that are spaced apart.

2. The system of claim 1, wherein each of the side subband components and mid subband components corresponds to a respective frequency band of a group of frequency bands, and wherein at least one frequency band of the group of frequency bands includes a set of critical bands.

3. The system of claim 2, wherein the at least one frequency band corresponds to a grouping of contiguous Bark scale critical bands.

4. The system of claim 1, wherein the sound includes a monofill region in between a first crosstalk cancelled listening region of the plurality of crosstalk cancelled listening regions and a second crosstalk cancelled listening region of the plurality of crosstalk cancelled listening regions.

5. The system of claim 1, further comprising a crosstalk compensation processor configured to execute stored instructions to:

receive the input audio signal comprising the left channel and the right channel; and compensate for crosstalk processing artifacts by applying a plurality of filters to the left channel and the right channel, wherein the crosstalk processing artifacts are produced by processing the left enhanced channel and the right enhanced channel using the crosstalk cancellation processor.

6. The system of claim 5, wherein the crosstalk compensation processor is configured to execute stored instructions to compensate for the crosstalk processing artifacts through:

application of a plurality of mid filters of the plurality of filters to a plurality of nonspatial components of the left channel and the right channel;

application of a plurality of side filters of the plurality of filters to a plurality of spatial components of the left channel and the right channel;

generation of a left crosstalk compensation channel by summing the plurality of filtered nonspatial components with the plurality of filtered spatial components; and generation of a right crosstalk compensation channel by subtracting the plurality of filtered spatial components from the plurality of filtered nonspatial components.

7. The system of claim 1, further comprising a combiner coupled to a crosstalk compensation processor, the subband spatial processor, and the crosstalk cancellation processor, the combiner configured to execute stored instructions to:

receive a left crosstalk compensation channel and a right crosstalk compensation channel from the crosstalk compensation processor;

receive the left enhanced channel and the right enhanced channel from the subband spatial processor;

combine the left enhanced channel with the left crosstalk compensation channel to generate a left compensation channel; and combine the right enhanced channel with the right crosstalk compensation channel to generate a right compensation channel.

8. The system of claim 7, wherein the crosstalk cancellation processor is configured to execute stored instructions to:

generate the left output channel through:

separation of the left compensation channel into a left in-band channel and a left out-of-band channel;

generation of a left crosstalk cancellation component by filtering and time delaying the left in-band channel; and generation of the left output channel by combining a right crosstalk cancellation component with the left in-band channel and the left out-of-band channel; and generate the right output channel through:

separation of the right compensation channel into a right in-band channel and a right out-of-band channel;

generation of the right crosstalk cancellation component by filtering and time delaying the right in-band channel; and generation of the right output channel by combining the left crosstalk cancellation component with the right in-band channel and the right out-of-band channel.

9. The system of claim 1, wherein the left speaker and the right speaker addressing outward with respect to each other comprises the left speaker addressing at an angle between 30 degrees and 180 degrees with respect to the right speaker.

10. The system of claim 1, wherein:

the crosstalk cancellation processor is further configured to execute stored instructions to provide the left output channel to another left speaker and the right output channel to another right speaker;

wherein:

the left speaker and the other left speaker address outward with respect to each other and form a left speaker pair;

the right speaker and the other right speaker address outward with respect to each other and form a right speaker pair; and the left speaker pair and right speaker pair are spaced apart with the other left speaker and the other right speaker addressing inward with respect to each other.

11. The system of claim 1, wherein the left speaker and the right speaker are located in proximity to each other.

12. A non-transitory computer readable medium comprising stored instructions, wherein the stored instructions, when executed by a processor, cause the processor to:

receive an input audio signal comprising a left channel and a right channel; and generate a left enhanced channel and a right enhanced channel by gain adjusting side subband components and mid subband components of the left and right input channels;

generate a cross-talk cancelled left output channel and a cross-talk cancelled right output channel based on the left enhanced channel and the right enhanced channel; and provide the left output channel to a left speaker and the right output channel to a right speaker to generate a sound providing a plurality of crosstalk cancelled listening regions that are spaced apart, the left speaker and the right speaker addressing outward with respect to each other.

13. The non-transitory computer readable medium of claim 12, wherein each of the side subband components and mid subband components corresponds to a respective frequency band of a group of frequency bands, and wherein at least one frequency band of the group of frequency bands includes a set of critical bands.

14. The non-transitory computer readable medium of claim 13, wherein the at least one frequency band corresponds to a grouping of contiguous Bark scale critical bands.

15. The non-transitory computer readable medium of claim 12, wherein the stored instructions further comprising instructions that, when executed by the processor, cause the processor to:

receive the input audio signal comprising the left channel and the right channel; and compensate for crosstalk processing artifacts by applying a plurality of filters to the left channel and the right channel, wherein the crosstalk processing artifacts are produced by processing the left enhanced channel and the right enhanced channel.

16. The non-transitory computer readable medium of claim 14, wherein the instructions to compensate for the crosstalk processing artifacts comprises instructions that, when executed by the processor, cause the processor to:

apply a plurality of mid filters of the plurality of filters to a plurality of nonspatial components of the left channel and the right channel;

apply a plurality of side filters of the plurality of filters to a plurality of spatial components of the left channel and the right channel;

generate a left crosstalk compensation channel by summing the plurality of filtered nonspatial components with the plurality of filtered spatial components; and generate a right crosstalk compensation channel by subtracting the plurality of filtered spatial components from the plurality of filtered nonspatial components.

17. The non-transitory computer readable medium of claim 12, wherein the stored instructions further comprising instructions that, when executed by the processor, cause the processor to:

receive a left crosstalk compensation channel and a right crosstalk compensation channel;

receive the left enhanced channel and the right enhanced channel from the subband spatial processor;

combine the left enhanced channel with the left crosstalk compensation channel to generate a left compensation channel; and combine the right enhanced channel with the right crosstalk compensation channel to generate a right compensation channel.

18. The non-transitory computer readable medium of claim 17, wherein the stored instructions further comprising instructions that, when executed by the processor, cause the processor to:

generate the left output channel through:

separation of the left compensation channel into a left in-band channel and a left out-of-band channel;

generation of a left crosstalk cancellation component by filtering and time delaying the left in-band channel; and generation of the left output channel by combining a right crosstalk cancellation component with the left in-band channel and the left out-of-band channel; and generate the right output channel through:

separation of the right compensation channel into a right in-band channel and a right out-of-band channel;

generation of a right crosstalk cancellation component by filtering and time delaying the right in-band channel; and generation of the right output channel by combining the left crosstalk cancellation component with the right in-band channel and the right out-of-band channel.

19. The non-transitory computer readable medium of claim 12, wherein the left speaker and the right speaker addressing outward with respect to each other comprises the left speaker addressing at an angle between 30 degrees and 180 degrees with respect to the right speaker.

20. The non-transitory computer readable medium of claim 12, wherein the stored instructions further comprising instructions that, when executed by the processor, cause the processor to:

provide the left output channel to another left speaker and the right output channel to another right speaker; and wherein:

the left speaker and the other left speaker address outward with respect to each other and form a left speaker pair;

the right speaker and the other right speaker address outward with respect to each other and form a right speaker pair; and the left speaker pair and right speaker pair are spaced apart with the other left speaker and the other right speaker addressing inward with respect to each other.

21. A method comprising:

receiving an input audio signal comprising a left channel and a right channel;

generating a left enhanced channel and a right enhanced channel by gain adjusting side subband components and mid subband components of the left and right input channels;

generate a cross-talk cancelled left output channel and a cross-talk cancelled right output channel based on the left enhanced channel and the right enhanced channel; and providing the left output channel to a left speaker and the right output channel to a right speaker to generate a sound providing a plurality of crosstalk cancelled listening regions that are spaced apart, the left speaker and the right speaker addressing outward with respect to each other.

22. The method of claim 21, wherein each of the side subband components and mid subband components corresponds to a respective frequency band of a group of frequency bands, and wherein at least one frequency band of the group of frequency bands includes a set of critical bands.

23. The method of claim 21, further comprising:

receiving the input audio signal comprising the left channel and the right channel; and compensating for crosstalk processing artifacts by applying a plurality of filters to the left channel and the right channel, wherein the crosstalk processing artifacts are produced by processing the left enhanced channel and the right enhanced channel.

24. The method of claim 23, wherein compensating for the crosstalk processing artifacts comprises:

applying a plurality of mid filters of the plurality of filters to a plurality of nonspatial components of the left channel and the right channel;

applying a plurality of side filters of the plurality of filters to a plurality of spatial components of the left channel and the right channel;

generating a left crosstalk compensation channel by summing the plurality of filtered nonspatial components with the plurality of filtered spatial components; and generating a right crosstalk compensation channel by subtracting the plurality of filtered spatial components from the plurality of filtered nonspatial components.

25. The method of claim 21, further comprising:

receiving a left crosstalk compensation channel and a right crosstalk compensation channel;

receiving the left enhanced channel and the right enhanced channel from the subband spatial processor;

combining the left enhanced channel with the left crosstalk compensation channel to generate a left compensation channel; and combining the right enhanced channel with the right crosstalk compensation channel to generate a right compensation channel.

26. The method of claim 25, further comprising:

generating the left output channel by:

separating the left compensation channel into a left in-band channel and a left out-of-band channel;

generating a left crosstalk cancellation component by filtering and time delaying the left in-band channel; and generating the left output channel by combining a right crosstalk cancellation component with the left in-band channel and the left out-of-band channel; and generating the right output channel by:

separating the right compensation channel into a right in-band channel and a right out-of-band channel;

generating a right crosstalk cancellation component by filtering and time delaying the right in-band channel; and generating the right output channel by combining the left crosstalk cancellation component with the right in-band channel and the right out-of-band channel.

27. The method of claim 21, further comprising:

providing the left output channel to another left speaker and the right output channel to another right speaker; and wherein:

the left speaker and the other left speaker address outward with respect to each other and form a left speaker pair;

the right speaker and the other right speaker address outward with respect to each other and form a right speaker pair; and the left speaker pair and right speaker pair are spaced apart with the other left speaker and the other right speaker addressing inward with respect to each other.

* * * * *